United States Patent [19]

Kung et al.

[11] Patent Number: 6,005,878

[45] Date of Patent: Dec. 21, 1999

[54] EFFICIENT FREQUENCY CONVERSION APPARATUS FOR USE WITH MULTIMODE SOLID-STATE LASERS

[75] Inventors: Andrew H. Kung, Taipei, Taiwan; Jr-i Lee, West Lafayette, Ind.

[73] Assignee: Academia Sinica, Taipei, Taiwan

[21] Appl. No.: 09/146,654

[22] Filed: Sep. 3, 1998

Related U.S. Application Data

[63] Continuation-in-part of application No. 08/802,078, Feb. 19, 1997.

[51] Int. Cl.$^6$ .......................................................... H01S 3/10
[52] U.S. Cl. ............................... 372/22; 372/29; 372/31; 372/69; 372/98; 372/94
[58] Field of Search .................................. 372/29, 31, 69, 372/98, 94, 92, 22

[56] References Cited

U.S. PATENT DOCUMENTS

| | | | |
|---|---|---|---|
| 4,884,277 | 11/1989 | Anthon et al. ............................. | 372/22 |
| 5,047,668 | 9/1991 | Bosenberg . | |
| 5,117,126 | 5/1992 | Geiger ....................................... | 372/22 |
| 5,144,630 | 9/1992 | Lin ............................................ | 372/22 |
| 5,195,104 | 3/1993 | Geiger et al. . | |
| 5,237,578 | 8/1993 | Amano ...................................... | 372/22 |
| 5,274,650 | 12/1993 | Amano ...................................... | 372/22 |
| 5,278,852 | 1/1994 | Wu et al. ................................... | 372/22 |
| 5,400,173 | 3/1995 | Komine .................................... | 372/21 |
| 5,406,408 | 4/1995 | Ellingson et al. . | |
| 5,477,378 | 12/1995 | Johnson . | |
| 5,742,626 | 4/1998 | Mead et al. ............................... | 372/22 |

OTHER PUBLICATIONS

Ashkin, IEEE Journal of Quantum Electronics, "Resonant Optical Second Harmonic Generation and Mixing," QE–2:6:109–124, Jun. 1966.

Knittel et al., IEEE Journal of Quantum Electronics, "Fourth Harmonic Generation in a Resonant Ring Cavity," 33:11:2021–2028, Nov. 1977.

Knittel et al., Optics Letters, "39.5% Conversion of Low–Power Q–Switched Nd:Yag Laser Radiation to 266 nm by use of a Resonant Ring Cavity," 22:6:366–368, Mar. 15, 1997.

Kung et al., Applied Physics Letter, "An Efficient All–Solid–State Ultraviolet Laser Source," 72:13:1542–4, Mar. 30, 1998.

Kung et al., SPIE, "Compact Solid State UV Laser for Photochemistry and Materials Processing," vol. 3272, pp. 100–104, 1998.

Tidwell et al., Optics Letters, "Efficient High–Power UV Generation by use of a Resonant Ring Driven by a CW Mode–Locked IR Laser," 18:18:1517–1519, Sep. 15, 1993.

Zimmermann et al., Applied Physics Letters, "All Solid State Laser Source for Tunable Blue and Ultraviolet Radiation," 66:18:2318–2320, May 1, 1995.

*Primary Examiner*—Leon Scott, Jr.
*Attorney, Agent, or Firm*—Fish & Richardson P.C.

[57] ABSTRACT

The invention features an apparatus providing electromagnetic radiation including: a first non-linear optical crystal for converting input radiation from a laser into intermediate radiation; a second non-linear optical crystal for converting the intermediate radiation into output radiation; and a plurality of optics forming an optical cavity that encloses the first and second non-linear optical crystals, substantially confines and resonates the intermediate radiation, and has a cavity length matching the cavity length of the laser to within less than the coherence length of the input radiation. The apparatus can be used to convert the output from a multimode, diode-pumped, solid-state laser into high power ultraviolet radiation.

20 Claims, 8 Drawing Sheets

EFFICIENT FREQUENCY CONVERSION APPARATUS FOR USE WITH MULTIMODE SOLID-STATE LASERS

CROSS-REFERENCE TO RELATED APPLICATIONS

This application is a continuation-in-part of U.S. Ser. No. 08/802,078 filed Feb. 19, 1997, the contents of which are incorporated herein by reference, in its entirety.

BACKGROUND OF THE INVENTION

The invention relates to lasers and systems for converting laser radiation from one frequency to another, e.g., to generate ultraviolet radiation.

There have been significant advances recently in the development of diode-pumped solid-state lasers. Such lasers are compact, reliable, and easy to use and maintain. Typically, these lasers can be connected to conventional AC outlets and produce output powers of a few watts without the need for cumbersome power supplies and coolant systems.

Most diode-pumped solid-state lasers operate multimode. In a multimode laser, multiple longitudinal modes resonate simultaneously without any defined phase coherence, i.e., phase relationships between the longitudinal modes are allowed to fluctuate randomly. Multimode lasers are different from mode-locked and single-mode lasers.

For example, a mode-locked laser includes an element, e.g., an acousto-optic modulator, an electro-optic modulator, or a Kerr-lens aperture, which prevents longitudinal modes from resonating unless they are in-phase and "locked" with one another. The locked longitudinal modes produce as the laser output a train of short pulses spaced from one another by the round-trip time of the laser cavity and each having a duration proportional to the inverse of the frequency bandwidth of the locked longitudinal modes. In a single-mode laser, a single longitudinal mode is preferentially amplified, thereby producing a laser output having a narrow frequency band and a long coherence length. For a general reference on multimode, mode-locked, and single-mode lasers, see, e.g., A. E. Siegman, *Lasers,* (University Science Books, Mill Valley, Calif., 1986).

For many applications, e.g., material processing, laser marking, and photolithography, the pulsed output of mode-locked lasers and the narrow-frequency output of single-mode lasers are unnecessary. For such applications, multi-mode lasers, and in particular multimode diode-pumped solid-state lasers, can be more suitable since they tend to be simpler, more compact, and more efficient than comparable mode-locked and single-mode lasers.

However, for many applications, ultraviolet wavelengths are necessary. For example, in photolithography applications, 300 mJ at 193 nm is typically required to process an eight inch diameter wafer in 300 msec. To achieve such wavelengths, the visible to near infrared output of most solid-state lasers can be passed through non-linear optical (NLO) crystals that convert the infrared output into its harmonics in the ultraviolet region. Unfortunately, such conversions typically have poor efficiencies and often require tight focusing that can damage the NLO crystals and affect stability.

SUMMARY OF THE INVENTION

The invention features a frequency conversion apparatus for use with lasers, including multimode lasers such as diode-pumped solid state lasers. In a particular embodiment, the frequency conversion apparatus permits efficient generation of the fourth harmonic of an input beam from a diode-pumped solid-state laser, providing high power, e.g., about 0.5 W, of ultraviolet (uv) radiation useful for a variety of applications including optical disk mastering, photolithography, material processing, laser trimming, laser marking, laser surgery, industrial diagnostics, and scientific research.

The invention is based, in part, on the discovery that the output from a multimode laser can be frequency-doubled and resonated within an external optical cavity.

In general, in one aspect, the invention features an apparatus providing electromagnetic radiation. The apparatus includes: a multimode laser, e.g., a diode-pumped solid-state laser, which during operation generates input radiation, the multimode laser having a cavity length and the input radiation having a coherence length; a first non-linear optical crystal for converting the input radiation into intermediate radiation; a second non-linear optical crystal for converting the intermediate radiation into output radiation; and a plurality of optics forming an optical cavity that encloses the first and second non-linear optical crystals, substantially confines and resonates the intermediate radiation, and has a cavity length matching the cavity length of the multimode laser to within less than the coherence length of the input radiation.

In another aspect, the invention features an apparatus for converting input radiation from a laser into output radiation, the apparatus including: a first non-linear optical crystal for converting the input radiation into intermediate radiation; a second non-linear optical crystal for converting the intermediate radiation into the output radiation; and a plurality of optics forming an optical cavity that encloses the first and second non-linear optical crystals and substantially confines and resonates the intermediate radiation, wherein the first and second non-linear optical crystals are positioned adjacent one another between a pair of the plurality of optics.

In a further aspect, the invention features an apparatus for converting input radiation from a laser into output radiation, the apparatus including: a first non-linear optical crystal for converting the input radiation into intermediate radiation; a second non-linear optical crystal for converting the intermediate radiation into the output radiation; and a plurality of optics forming an optical cavity that encloses the first and second non-linear optical crystals and substantially confines and resonates the intermediate radiation, wherein the second non-linear optical crystal radiates the output radiation along a path different from that of the intermediate radiation.

In a further aspect, the invention features an apparatus for converting first input radiation from a first laser and second input radiation from a second laser into output radiation, the apparatus including: a first non-linear optical crystal for converting the first input radiation into intermediate radiation; a second non-linear optical crystal for converting the intermediate radiation and the second input radiation into the output radiation; and a plurality of optics forming an optical cavity that encloses the first and second non-linear optical crystals and substantially confines and resonates the intermediate radiation. For example, the second non-linear crystal sum-frequency generates the output radiation from the intermediate radiation and the second input radiation.

Embodiments of the above apparati can include any of the following features.

The first non-linear optical crystal frequency can double the input radiation to produce the intermediate radiation and the second non-linear optical crystal frequency can double the intermediate radiation to produce the output radiation.

The apparatus can include a third non-linear optical crystal positioned to receive the output radiation and an unconverted portion of the input radiation and produce therefrom additional output radiation. For example, the frequency of the additional output radiation can be the sum of the frequencies of the output radiation and the input radiation. In particular, if the first and second non-linear optical crystals frequency double the input and intermediate radiation, respectively, the frequency of the additional output radiation is the fifth harmonic of the input radiation. The first, second, and third non-linear optical crystals can include materials such as BBO, LBO, KDP, KD*P KTP, KTA, CLBO, SBBO, KBBF, Urea, $KNbO_3$, $MgO:LiNnO_3$, $LiNbO_3$, $LiIO_3$, and $KNbO_3$.

The plurality of optics can further include a control optic and the apparatus can further include a control system connected to the control optic, which stabilizes the optical path length of the external cavity to an integral multiple of the wavelength of the intermediate radiation. Alternatively, or in addition, the control system can stabilize the optical path length such that the intensity of the output radiation or the additional output radiation is optimized. For example, the control system can include: a detector for monitoring the intensity of the output radiation; a controller which receives an input signal from the detector indicative of the intensity of the output radiation; and a transducer mounted to the control optic and operative to adjust the position of the control optic in response to an output signal from the controller.

The plurality of optics can also include first, second, and third mirrors, each highly reflecting the intermediate radiation, the first mirror transmitting input radiation from the laser into the cavity, the second mirror transmitting output radiation out of the cavity, and the third mirror being curved. The first and second non-linear optical crystals can be positioned between the first and second mirrors. Also, one of the first, second, and third mirrors can also be the control optic.

Finally, the optical cavity can define an optical path for the intermediate radiation that traverses the second non-linear optical crystal along multiple directions.

A multimode laser is a laser in which multiple longitudinal modes resonate simultaneously and phase relationships between the resonating longitudinal modes fluctuate randomly. A mode-locked laser is a laser in which multiple longitudinal modes resonate simultaneously and phase relationships between the resonating longitudinal modes are fixed.

The invention has many advantages. For example, the frequency conversion apparatus can be combined with a commercially available diode-pumped solid-state laser to provide a compact, reliable, and inexpensive source for high power ultraviolet laser radiation. Furthermore, embodiments in which the NLO crystals are adjacent one another between the same pair of mirrors allow the placement of a third NLO crystal either inside or outside the cavity to produce the fifth harmonic of the input radiation. In addition, since the frequency-doubled radiation is being resonated, tight focusing of the laser radiation within the laser cavity is unnecessary, thereby improving the stability of the output radiation and limiting damage to the NLO crystals. For example, in some embodiments, the beam waist within the cavity is no smaller than about 100 microns.

Other features and advantages of the invention will be apparent from the following detailed description, and from the claims.

DETAILED DESCRIPTION

Figure 1:
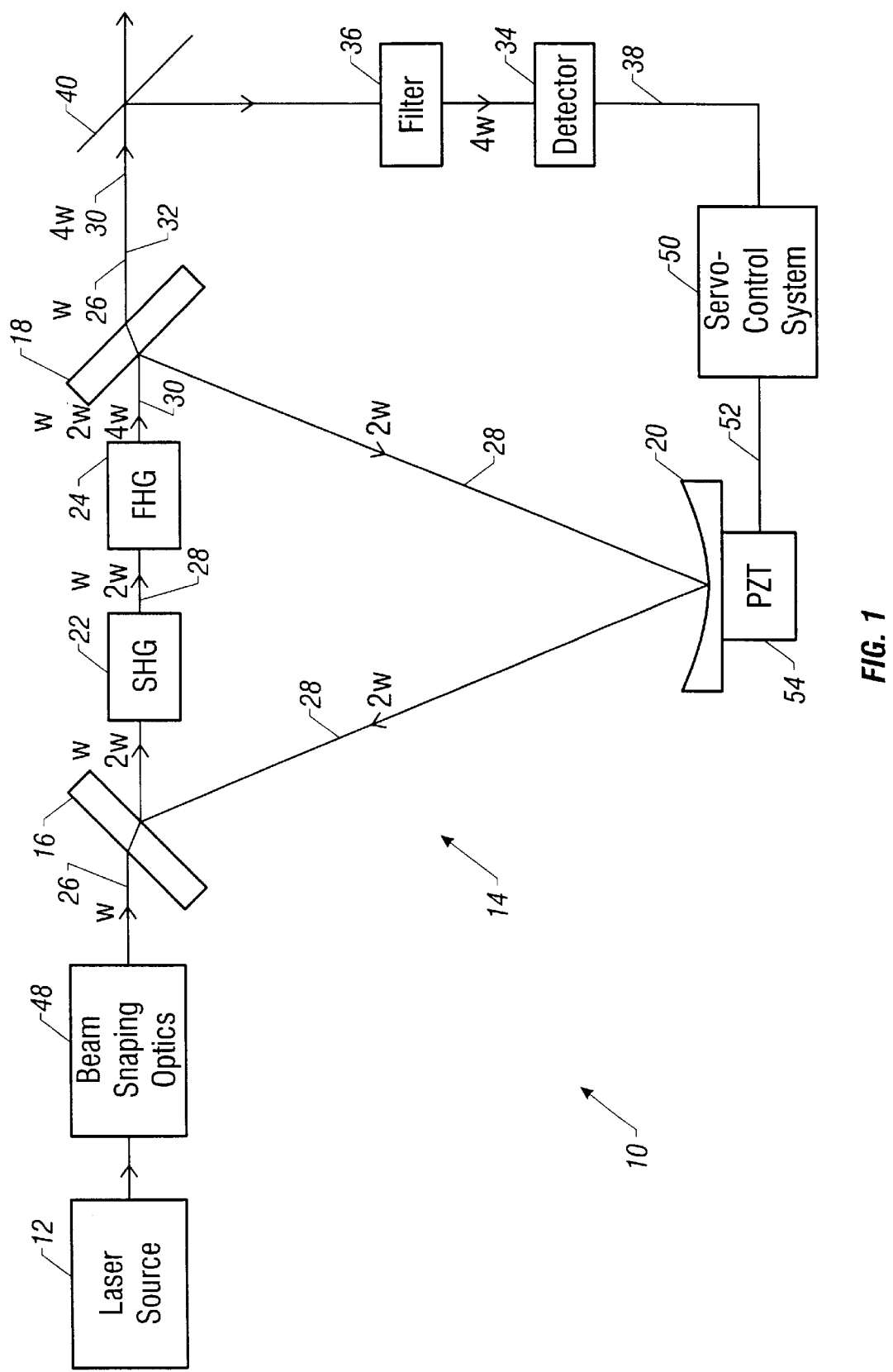
FIG. 1 is a schematic of a system for generating high power ultraviolet laser radiation based on fourth harmonic generation.

The invention features a reliable, efficient, and compact system for generating high power ultraviolet (uv) radiation. One such embodiment is shown in FIG. 1. The system 10 includes a source laser 12, e.g., a multimode diode-pumped solid-state laser, and an external optical cavity 14 formed by a plurality of mirrors, e.g., mirrors 16, 18, and 20, that enclose two non-linear optical (NLO) crystals 22 and 24, such as, e.g., KTP, KDP, BBO, LBO, $LiIO_3$, $LiNbO_3$, and $KNbO_3$. The plurality of mirrors are coated, e.g., with magnesium fluoride, to confine laser radiation having the second harmonic frequency $2\omega$ within the cavity, allow laser radiation having the fundamental frequency $\omega$ into the cavity, and allow laser radiation having the fourth harmonic frequency $4\omega$ out of the cavity. Although FIG. 1 depicts optical cavity 14 being formed by three mirrors, mirrors 16, 18, and 20, in other embodiments, the optical cavity can be formed by two or more mirrors, e.g., four or more mirrors can form a folded cavity.

In the embodiment shown in FIG. 1, source laser 12 directs input laser radiation 26 having frequency $\omega$ into optical cavity 14 through mirror 16, which is transmissive for radiation with frequency $\omega$ and highly reflective for radiation with frequency $2\omega$. In addition, mirror 18 is transmissive for radiation with frequencies $\omega$ and $4\omega$ and highly reflective for radiation with frequency $2\omega$, and mirror 20 is highly reflective for radiation with frequency $2\omega$. Once in the cavity, NLO crystal 22 frequency-doubles a portion of input radiation 26 to produce intermediate radiation 28 having frequency $2\omega$ (second harmonic generation or SHG), and NLO crystal 24 frequency doubles a portion of intermediate radiation 28 to produce output radiation 30 having frequency $4\omega$ (fourth harmonic generation or FHG). Using techniques known in the art, NLO crystals 22 and 24 are cut and oriented to optimize the second and fourth harmonic generation producing intermediate radiation 28 and output radiation 30, respectively, see, e.g., Y. R. Shen, *The Principles of Non-linear Optics,* (John Wiley and Sons, 1984).

Output radiation 30 (having frequency $4\omega$) and the remaining portion of input radiation 26 (having frequency ω) exit the cavity through mirror 18 and propagate along an output path 32. On the other hand, the remaining portion of intermediate radiation 28 (having frequency 2ω) remains confined in the cavity, being reflected by mirrors 16, 18, and 20. Upon being recirculated within the cavity, the confined intermediate radiation enhances additional frequency-doubling of input radiation 26 (having frequency ω) by NLO crystal 22 to produce additional intermediate radiation 28 (having frequency 2ω), and enhances additional frequency doubling of the newly produced intermediate radiation 28 in NLO crystal 24 to produce additional output radiation (having frequency 4ω).

To optimize such enhancement, the length of external cavity 14 matches the cavity length of source laser 10 to within a fraction of the coherence length of source laser 10 so that every wavelength in the intermediate radiation integrally divides the length of the external cavity. Thus, external cavity 14 resonates intermediate radiation (having a frequency 2ω), and thereby enhances the two-step conversion of input radiation (having a frequency ω) to output radiation (having a frequency 4ω) by NLO crystals 22 and 24. As exemplified by the Example at the end of this description, such enhancement results even when the phase relationships between the wavelengths of input radiation 26 fluctuate randomly, e.g., when a multimode laser generates the input radiation.

System 10 includes a servo-control system 50 to actively stabilize the length of external cavity 14 based on the intensity of output radiation 30 (having frequency 4ω) exiting the cavity. A partial reflector 40 picks off a small portion of output radiation 30 propagating along output path 32 and directs it to a detector 34. A filter 36 prevents radiation having frequency ω from reaching detector 34. The detector sends an input signal 38 indicative of the intensity of output radiation 30 to servo-control system 50, which sends an output signal 52 to a piezoelectric transducer (PZT) 54 mounted to mirror 20. Transducer 54 adjusts the position of mirror 20 and the length of external cavity 14 based on output signal 52. Servo-control system 50 includes an algorithm that adjusts the length of external cavity 14, via output signal 52, to optimize the intensity of output radiation 30, as indicated by input signal 38. One embodiment for such an algorithm is described in the Example at the end of this description.

In some embodiments, one or more of the mirrors forming external cavity 14 are curved to support a stable transverse mode within the cavity. For example, in the embodiment shown in FIG. 1, mirror 20 is a curved reflector. Methods for designing resonator cavities with stable transverse modes are known in the art, see, e.g., A. E. Siegman, ibid. In such embodiments, the beam size supported by external cavity 14 and the beam size of input radiation 26 are substantially equal at NLO crystal 22 to optimize the generation and enhancement of intermediate radiation 28. Beam shaping optics 48, e.g., a beam expander or condenser, can be used to adjust the beam size of source laser 12 accordingly.

Figure 2:
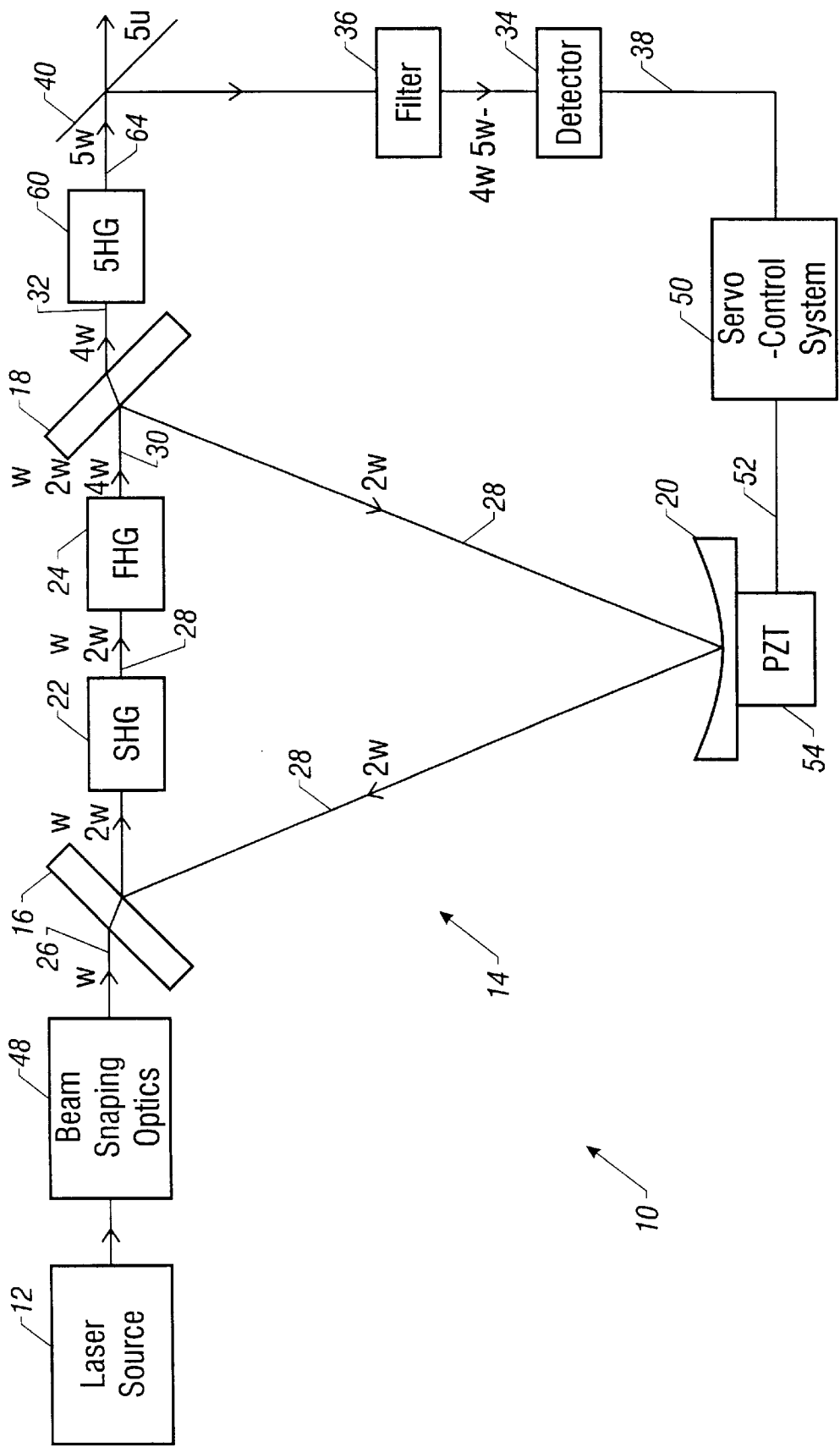
FIG. 2 is schematic of the system of FIG. 1 in which an additional NLO crystal is added to for fifth harmonic generation FIG 3. is a schematic of a system that is a variation of that in FIG. 1 and includes mirrors forming a criss-cross external cavity.

In the embodiment shown in FIG. 1, NLO crystals 22 and 24 are adjacent one another and between a pair of mirrors, i.e., mirrors 16 and 18. In other embodiments, the NLO crystals can be positioned within the external cavity between different pairs of mirrors. However, embodiments in which the NLO crystals are adjacent one another can be more compact. Furthermore, such embodiments permit generation of the fifth harmonic of the input radiation by placing a third NLO crystal 60, e.g., a KTP, KDP, BBO, LBO, LiIO$_3$, LiNbO$_3$, and KNbO$_3$ crystal, outside external cavity 14, as shown in FIG. 2.

In such an embodiment, NLO crystal 60 is positioned on output path 32 for sum frequency generation of output radiation 30 (having frequency 4ω) and the remaining portion of input radiation 26 (having frequency ω), which both exit the cavity through mirror 18. Thus, NLO crystal 60 generates additional output radiation 64 having frequency 5ω (fifth harmonic generation or 5 HG). In some cases, a dispersive compensating plate is positioned between mirror 18 and NLO crystal 60 to minimize any beam displacement between radiation 26 and 30 in NLO crystal 60. Such displacement may be caused by non-normal propagation of radiation 26 and 30 through NLO crystal 24 and mirror 18. In this embodiment, detector 34 can measure the intensity of output radiation 30 (having a frequency 4ω), additional output radiation 64 (having a frequency 5ω), or both, to produce input signal 38 that is sent to servo-control system 50. Alternatively, in other embodiments, the third NLO crystal can be positioned inside the external cavity.

Figure 3:
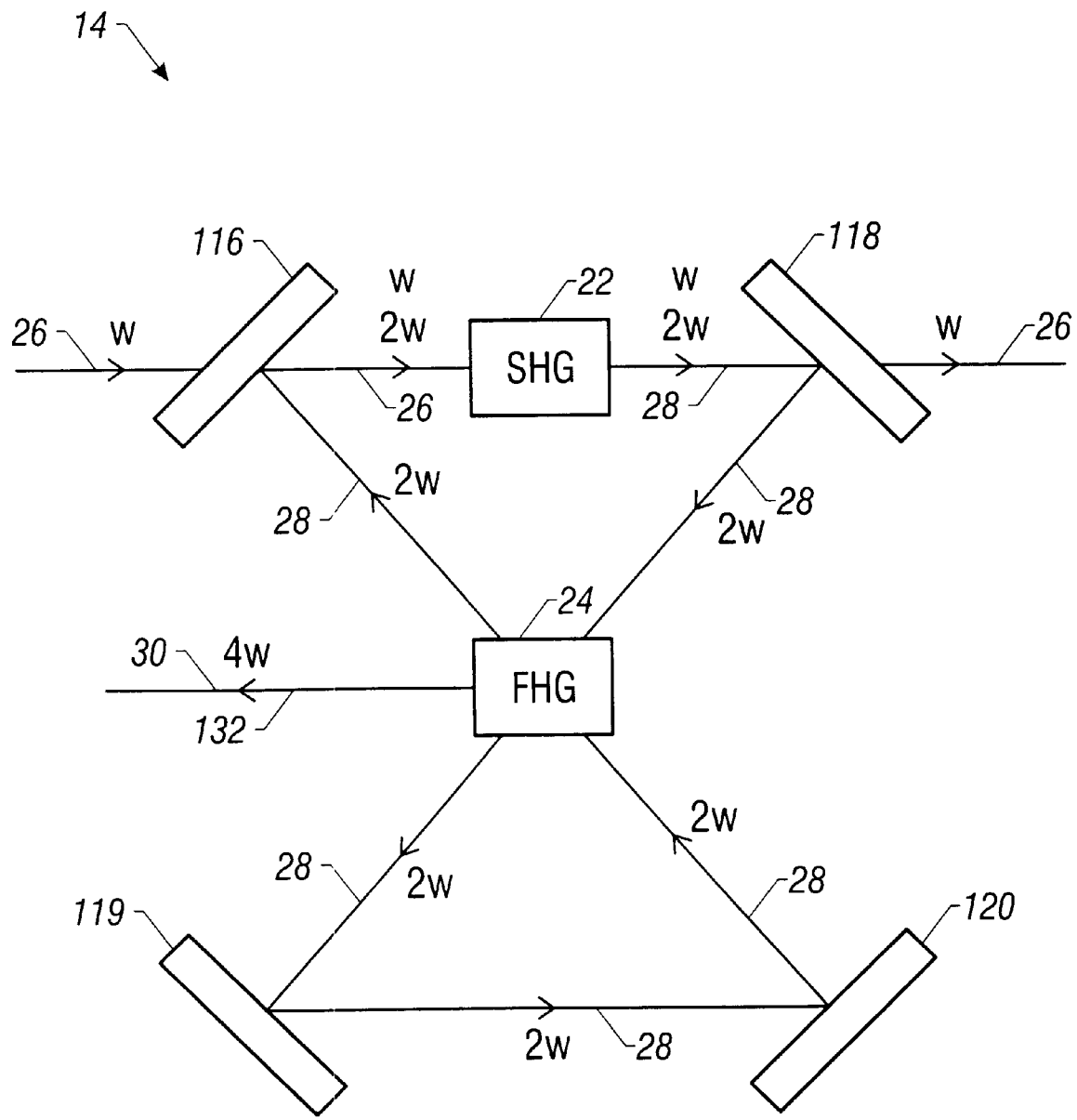

In further embodiments, different arrangements for the plurality optics forming the external cavity are also possible. For example, a criss-cross arrangement such as the one shown in FIG. 3 is possible. In this embodiment, external cavity 14 is formed by four mirrors, mirrors 116, 118, 119, and 120. Mirrors 116 and 118 enclose NLO crystal 22, which produces intermediate radiation 28 by frequency doubling input radiation 26. Mirrors 118 and 119 and mirrors 120 and 116 simultaneously enclose NLO crystal 24, which generates output radiation 30 along output path 132 by sum frequency generation of the intermediate radiation being directed to NLO crystal 24 from mirror 118 and the intermediate radiation being directed to NLO crystal 24 from mirror 120. Each of mirrors 116, 118, 119, and 120 reflect intermediate radiation having frequency 2ω, while mirrors 116 and 118 are coated to transmit radiation having the input radiation having frequency ω. In some cases, the non-collinear sum frequency generation by NLO crystal 24 in the criss-cross arrangement is more efficient than that of the embodiment in FIG. 1. In addition, in the criss-cross arrangement there is no need for a mirror that reflects radiation having frequency 2ω and transmits radiation having frequency 4ω.

Figure 4:
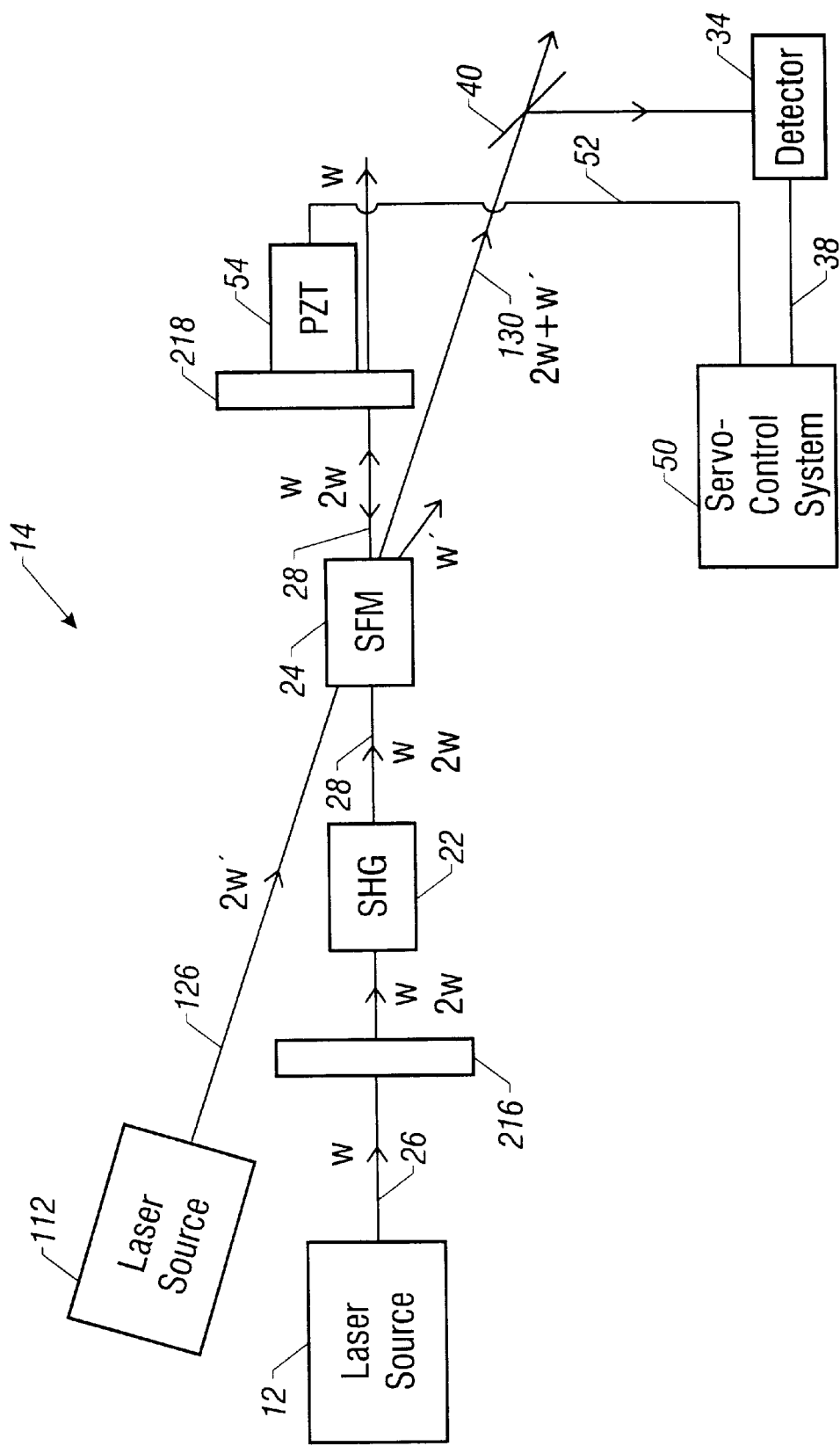
FIG. 4 is schematic of a system that is a variation of that in FIG. 1 and involves sum- or difference-frequency mixing on the second NLO crystal with radiation from a second laser source.

In further embodiments, as shown in FIG. 4, NLO crystal 24 can produce output radiation 130 having a frequency 2ω+ω' by sum frequency mixing (SFM) of recirculated intermediate radiation 28 having a frequency 2ω and second input radiation 126 having a frequency ω' generated by a second laser source 112. In the embodiment shown in FIG. 4, two mirrors 216 and 218 form external cavity 14 with PZT 54 connected to mirror 218. In other embodiments, more than two mirrors can be used to form the external cavity. In addition, NLO crystal 24 can be oriented to optimize difference frequency mixing (DFM) to produce output radiation having a frequency 2ω−ω'. As before, partial reflector 40 sends a portion of the output radiation to detector 34, which provides input signal 38 to control system 50 to stabilize the cavity length.

The invention will now be illustrated by the following non-limiting example.

A system for generating high-power uv radiation was built according to the schematic shown in FIG. 1. Laser source 12 was a commercially available multimode diode-pumped Q-switched Nd:YAG laser from Lightwave Electronics (model no. 210-1064-6000S) operating at 1.064 microns and from 1 to 50 kHz. Mirrors 16, 18, and 20 were high reflecting (R>99.5%) at 532 nm. Mirrors 16 and 18 were flat and were also highly transmitting at 1064 nm and 266 nm, respectively. Mirror 20 had a radius of curvature of 1 m.

NLO crystal 22 was a 3×3×5 mm³ type-II second harmonic generation KTP crystal, dual antireflection coated for 1064 and 532 nm. NLO crystal 24 was a 4×4×4 mm³ type-I BBO crystal that was dual antireflection coated for 532 and 266 nm. Input radiation 26 from source 12 was focused to a spot size of about 0.6 mm at NLO crystals 22 and 24.

The length of external cavity 14 was matched to the cavity length of source laser 12 and stabilized to within less than a fraction of its coherence length, which was about 1 mm, by control system 50. To determine the cavity length of source laser 12, which was hermetically-sealed, the temporal profile of the laser output was measured and Fourier transformed. Since the temporal profile exhibits mode-beating caused by the fluctuating phases of the output frequency modes, the Fourier transformed profile includes a beat frequency peak that equals c/2l, where l is the optical length of the cavity. Piezoelectric transducer 54 had a linear travel of 6 μm over an applied voltage range of 0 to 100 volts, which was provided by output signal 52 from servo-control system 50. Detector 34 measured a portion of 266 nm output radiation and generated input signal 38 which was sent to servo-control system 50 and was proportional to the intensity of output radiation 30.

Figure 5:
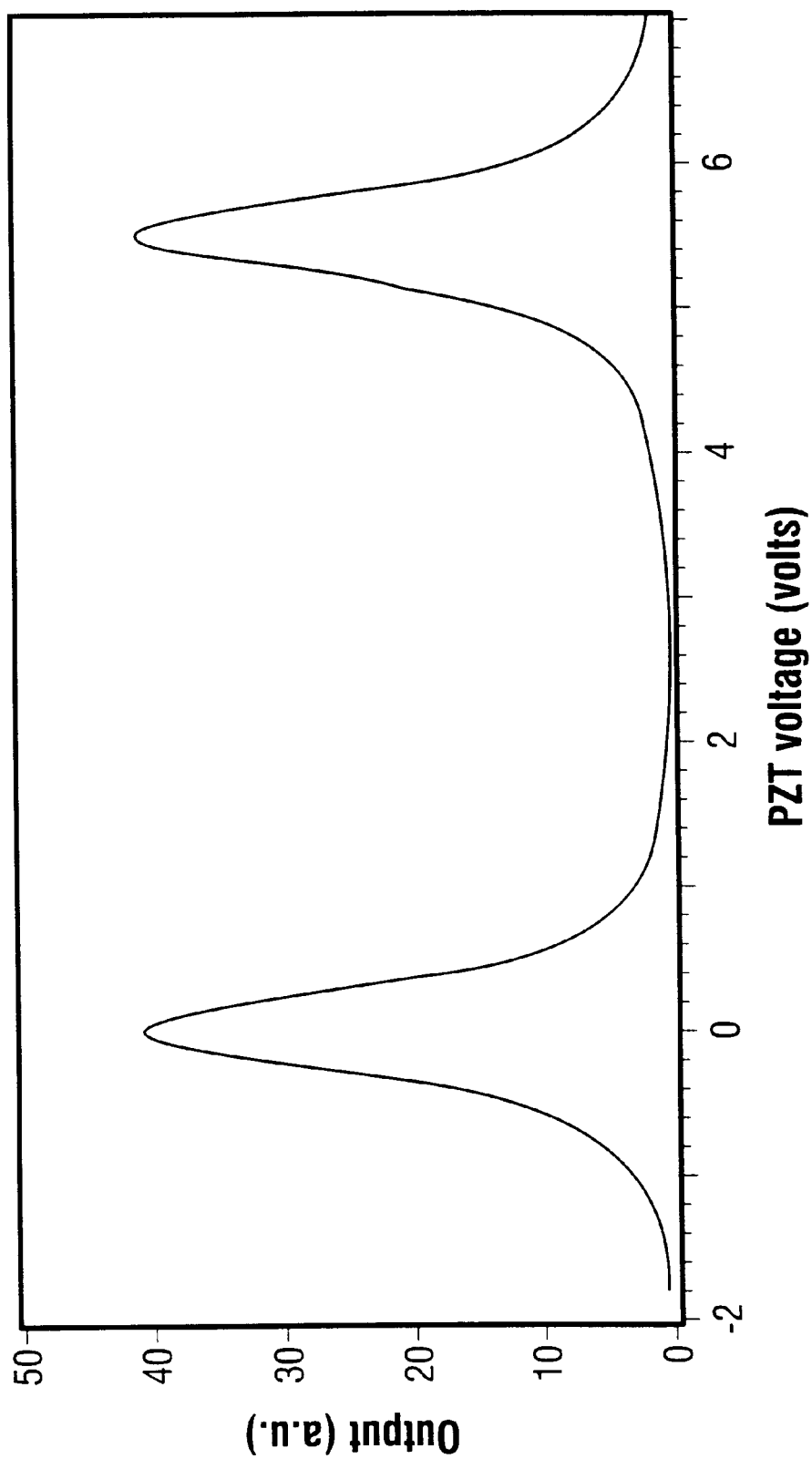
FIG. 5 is a graph of the ultraviolet output radiation versus voltage applied to a piezoelectric transducer stabilizing the external cavity length.

FIG. 5 shows the intensity of the uv output radiation 30 measured by detector 34 as function of the voltage applied to PZT 54 by servo-control system 50. The peaks in FIG. 5 were separated by about 5.5 V indicating that this was the voltage range over which the length of external cavity 14 changes by one second harmonic (2ω) wavelength. Thus, to stabilize the length of cavity 14 to within less than about 1/100 of the second harmonic wavelength, the voltage increments in output signal 52 were kept less than 50 mV, in particular, the voltage increments were ΔV=±39 mV.

Figure 6:
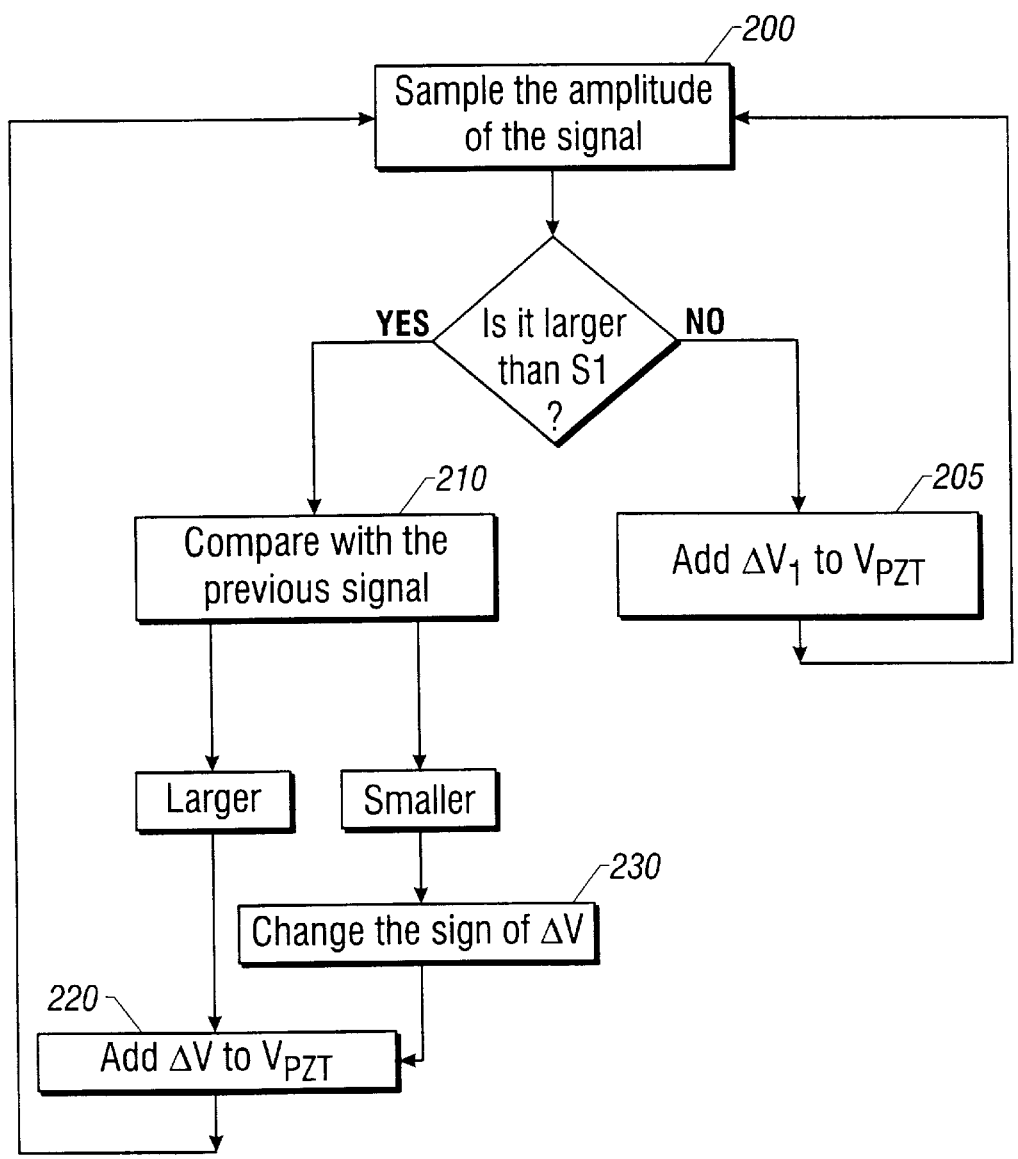
FIG. 6 is a flow diagram of the algorithm used to control the external cavity length.

Stabilization of the external cavity length by servo-control system 50 was performed using a feed-forward algorithm shown in FIG. 6. First system 50 applied an initial voltage $V_O$ to the PZT ($V_{PZT}=V_O$) and sampled input signal 38 from detector 34, which indicated the intensity of uv output radiation 30. Then, after each trigger pulse to source laser 12, system 50 resampled input signal 38 (step 200). If the input signal was not greater than some threshold value S1, system 50 increased $V_{PZT}$ by ΔV=0.68 V (step 205), otherwise system 50 compared the signal with the signal from the previous sample (step 210). If the present signal was greater than the signal from the previous sample by a threshold value S2, PZT was moving in the correct direction, and system 50 increased $V_{PZT}$ by ΔV=39 mV (step 220). If instead the present signal was smaller than the signal from the previous sample by the threshold value S2, the PZT was moving in the wrong direction, and system 50 changed the sign of ΔV (step 230) before increasing $V_{PZT}$ by ΔV (step 220). Differences less than threshold value S2 were ignored. Thereafter, the algorithm repeated with system 50 resampling input signal 38 (return to step 200).

The time constant for the algorithm depended on the trigger rate, e.g., for the kHz operation of source laser 12 the time-constant was in the msec range. Since random fluctuations caused by air movement and mechanical vibrations were slow compared to such a time-constant, the algorithm robustly stabilized the external cavity length. The threshold value S1 was set high enough to prevent the external cavity length from equilibrating at a length at which stable, single-pass (non-resonant) uv radiation is generated.

In other embodiments, it is also possible for the feed-forward algorithm to operate at repetition rates slower than that of source laser 12 but faster than the timescales for air movement and mechanical vibrations. For example, system 50 may only sample input signal 38 once for every three output pulses.

Figure 7:
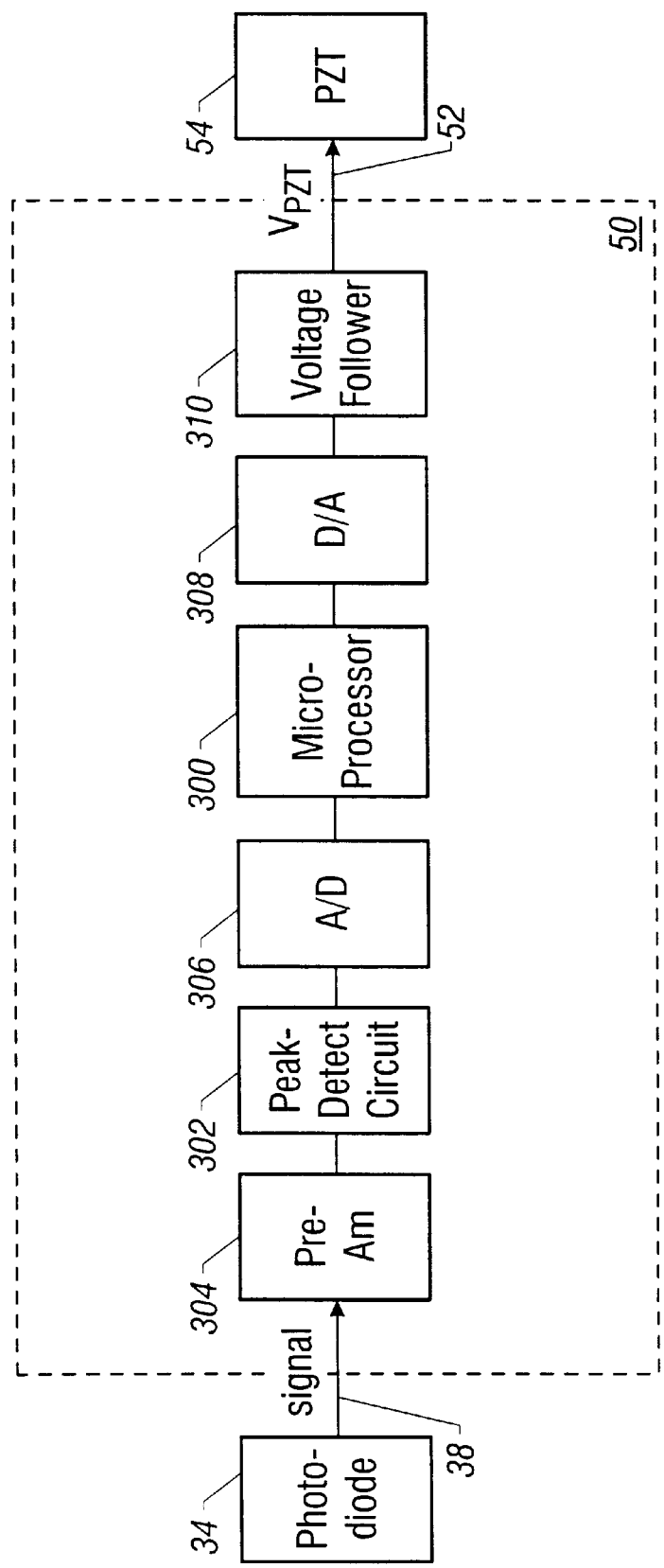
FIG. 7 is a schematic of the electronics in the servo-control system.

The electronics of servo-control system 50 are shown in FIG. 7. The algorithm was written into an assembly language routine, stored into the random access memory of a microprocessor 300, and implemented using hardware based on the microprocessor and peripheral circuits. Detector 34 (a photodiode) was designed to provide a long fall time ($t_f$=40 μs) and a relatively short rising time ($t_r$=330 ns) to match the timing characteristics of a peak-detector circuit 302. After the input signal was amplified by a preamplifier 304, peak detector circuit 302, including an operation amplifier and discrete electronic elements, sampled the peak value of the signal. A first A/D converter 306 digitized this value and transmitted it into microprocessor 300 (a single-chip microprocessor, 89C51). The output from microprocessor 300 was a digital signal proportional to the voltage to be applied to the PZT. This digital output was sent to a D/A converter 308 and then to a voltage follower 310, which outputs voltage signal 52 to PZT 54. The whole process can be completed within 100 μs. The circuit uses standard digital and analog components.

Figure 8:
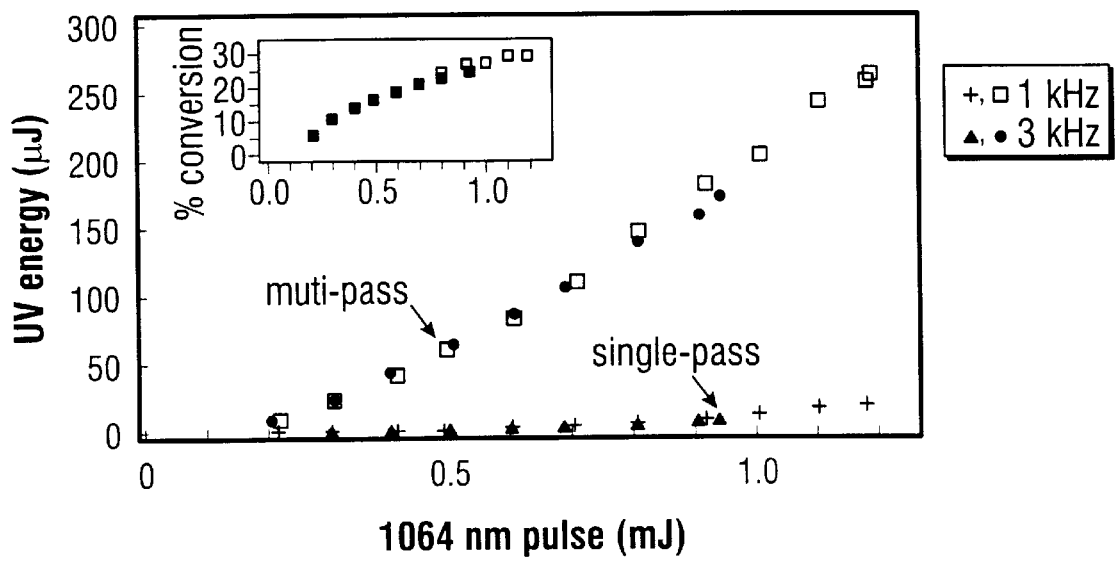
FIG. 8 is graph of ultraviolet (266 nm) pulse energy versus input pulse energy (1064 nm).
Figure 9:
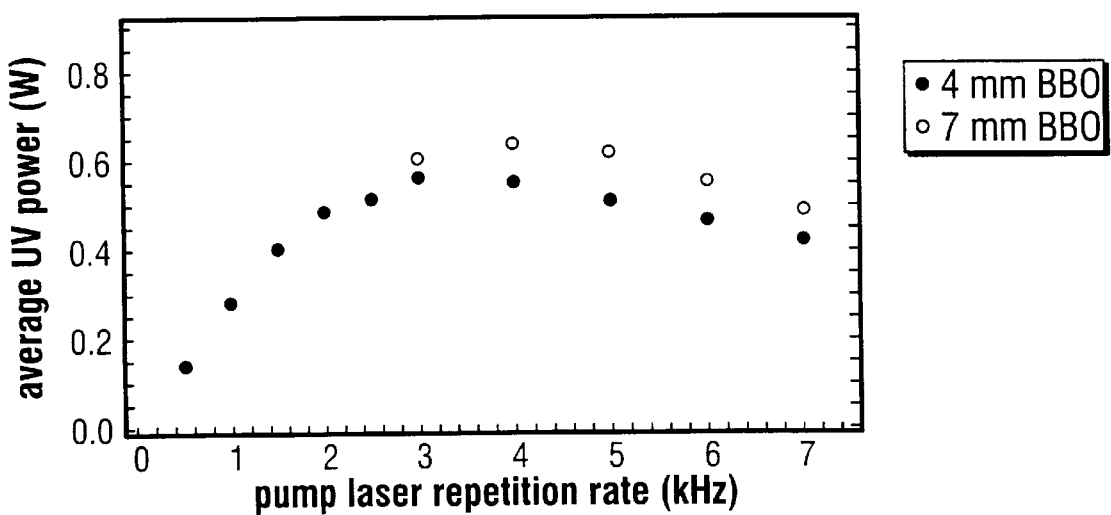
FIG. 9 is a graph of average ultraviolet (266 nm) power versus the repetition rate of the source laser.

FIG. 8 depicts the uv output at 266 nm as a function of the incident ir pulse energy for two different repetition rates of source laser 12. When the cavity length was adjusted to satisfy the resonance condition, substantial enhancement in the 532 nm power and consequently the 266 nm power was observed. At the highest available input pulse energy of 1.18 mJ, about 0.27 mJ of uv radiation was extracted. After making corrections for surface reflections and mirror transmission losses, this gives an internal ir-uv conversion of over 30%. As shown in the inset to FIG. 8, the conversion efficiency was quite insensitive to the input power, rising from 20% to 30% over a change of a factor of 2 in the input. The measured average power is shown in FIG. 9. With the 4 mm long BBO crystal, a maximum of 560 mW was extracted, at 3 kHz.

Other Embodiments

It is to be understood that while the invention has been described in conjunction with the detailed description thereof, that the foregoing description is intended to illustrate and not limit the scope of the invention, which is defined by the scope of the appended claims.

What is claimed is:

1. An apparatus providing electromagnetic radiation, the apparatus comprising:
    a multimode laser which during operation generates input radiation, the multimode laser having a cavity length and the input radiation having a coherence length;
    a first non-linear optical crystal for converting the input radiation into intermediate radiation;
    a second non-linear optical crystal for converting the intermediate radiation into output radiation; and
    a plurality of optics forming an optical cavity that encloses the first and second non-linear optical crystals, substantially confines and resonates the intermediate radiation, and has a cavity length matching the cavity length of the multimode laser to within less than the coherence length of the input radiation.

2. The apparatus of claim 1, wherein the intermediate radiation has a wavelength, the optical cavity defines an optical path length for the intermediate radiation, the plurality of optics further includes a control optic, and the apparatus further comprises a control system connected to the control optic for stabilizing the optical path length to an integral multiple of the wavelength of the intermediate radiation.

3. The apparatus of claim 1, wherein the optical cavity defines an optical path length for the intermediate radiation, the plurality of optics further includes a control optic, the output radiation has an intensity, and the apparatus further comprises a control system connected to the control optic for stabilizing the optical path length such that the intensity of the output radiation is optimized.

4. The apparatus of claim 3, and wherein the control system comprises:
- a detector for monitoring the intensity of the output radiation;
- a controller which receives an input signal from the detector indicative of the intensity of the output radiation; and
- a transducer mounted to the control optic and operative to adjust the position of the control optic in response to an output signal from the controller.

5. The apparatus of claim 1, wherein the first non-linear optical crystal frequency doubles the input radiation to produce the intermediate radiation.

6. The apparatus of claim 1, wherein the second non-linear optical crystal frequency doubles the intermediate radiation to produce the output radiation.

7. The apparatus of claim 1, wherein the first and second non-linear optical crystals comprise a material selected from the group consisting of BBO, LBO, KDP, KD*P KTP, KTA, CLBO, SBBO, KBBF, Urea, $KNbO_3$, $MgO:LiNnO_3$, $LiNbO_3$, $LiIO_3$ and $KNbO_3$.

8. The apparatus of claim 1, further comprising a third non-linear optical crystal positioned to receive the output radiation and an unconverted portion of the input radiation and produce therefrom additional output radiation.

9. The apparatus of claim 8, wherein the input, output, and additional output radiation each have a frequency, and the frequency of the additional output radiation is the sum of the frequency of the output radiation and the frequency of the input radiation.

10. The apparatus of claim 1, wherein the plurality of optics comprise first, second, and third mirrors, each highly reflecting the intermediate radiation, the first mirror transmitting input radiation from the laser into the cavity, the second mirror transmitting output radiation out of the cavity, and the third mirror being curved.

11. The apparatus of claim 1, wherein the multimode laser is a diode-pumped laser.

12. An apparatus for converting input radiation from a laser into output radiation, the apparatus comprising:
- a first non-linear optical crystal for converting the input radiation into intermediate radiation;
- a second non-linear optical crystal for converting the intermediate radiation into the output radiation; and
- a plurality of optics forming an optical cavity that encloses the first and second non-linear optical crystals and substantially confines and resonates the intermediate radiation, wherein the first and second non-linear optical crystals are positioned adjacent one another between a pair of the plurality of optics.

13. The apparatus of claim 12, further comprising a third non-linear optical crystal positioned to receive the output radiation and an unconverted portion of the input radiation and generate therefrom additional output radiation.

14. The apparatus of claim 13, wherein the first non-linear optical crystal frequency doubles the input radiation to generate the intermediate radiation, the second non-linear optical crystal frequency doubles the intermediate radiation to produce the output radiation, and the third non-linear optical crystal sum-frequency generates the output radiation and the unconverted portion of the input radiation to produce the additional output radiation, the additional output radiation being a fifth harmonic of the input radiation.

15. The apparatus of claim 13, wherein the optical cavity defines an optical path length for the intermediate radiation, the plurality of optics further includes a control optic, and the apparatus further comprises a control system connected to the control optic for stabilizing the optical path length such that the generation of the additional output radiation is optimized.

16. The apparatus of claim 12, wherein the plurality of optics comprise first, second, and third mirrors, each highly reflecting the intermediate radiation, the first mirror transmitting input radiation from the laser into the cavity and the second mirror transmitting output radiation out of the cavity, and third mirror being curved, wherein the first and second non-linear optical crystals are positioned between the first and second mirrors.

17. An apparatus for converting input radiation from a laser into output radiation, the apparatus comprising:
- a first non-linear optical crystal for converting the input radiation into intermediate radiation;
- a second non-linear optical crystal for converting the intermediate radiation into the output radiation; and
- a plurality of optics forming an optical cavity that encloses the first and second non-linear optical crystals and substantially confines and resonates the intermediate radiation, wherein the second non-linear optical crystal radiates the output radiation along a path different from that of the intermediate radiation.

18. The apparatus of claim 17, wherein the optical cavity defines an optical path for the intermediate radiation that traverses the second non-linear optical crystal along multiple directions.

19. An apparatus for converting first input radiation from a first laser and second input radiation from a second laser into output radiation, the apparatus comprising:
- a first non-linear optical crystal for converting the first input radiation into intermediate radiation;
- a second non-linear optical crystal for converting the intermediate radiation and the second input radiation into the output radiation; and
- a plurality of optics forming an optical cavity that encloses the first and second non-linear optical crystals and substantially confines and resonates the intermediate radiation.

20. The apparatus of claim 19, wherein the second non-linear crystal sum-frequency generates the output radiation from the intermediate radiation and the second input radiation.

* * * * *